March 26, 1957 — D. E. McCARTNEY — 2,786,547
CENTRIFUGAL SEPARATOR
Filed April 19, 1954
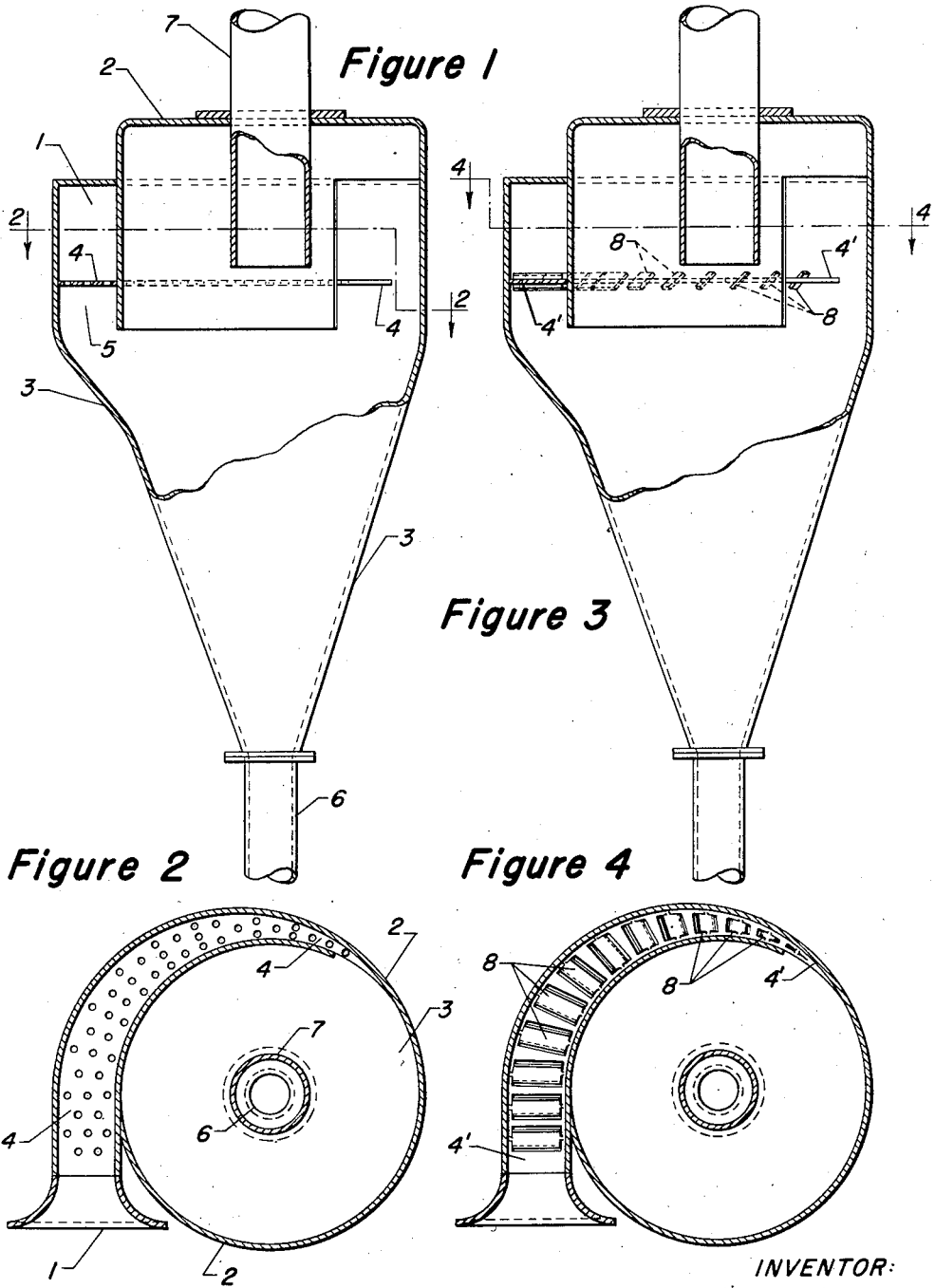
INVENTOR:
Daniel E. McCartney
By: Chester J. Giuliani
Philip T. Liggett
ATTORNEYS:

United States Patent Office 2,786,547
Patented Mar. 26, 1957

2,786,547

CENTRIFUGAL SEPARATOR

Daniel E. McCartney, Evanston, Ill., assignor to Universal Oil Products Company, Des Plaines, Ill., a corporation of Delaware Application April 19, 1954, Serial No. 424,007

4 Claims. (Cl. 183—83)

This invention relates to an improved centrifugal separator of the cyclone type and particularly to an improved separator which improves efficiency, especially in periods of high loading, and substantially reduces certain localized erosion which is characteristic of this type of separator.

In one embodiment this invention relates to an improved centrifugal particle separator having a tangential inlet conduit, particle outlet and gas outlet conduits, an elongated centrifugal separation zone, and a particle collecting zone, the improvement which comprises connecting said tangential inlet conduit through a perforate member to said particle collecting zone.

Centrifugal separators operate over a limited range of conditions of gas volume handled and particle concentration in the gas. Although these limits are fairly wide, efficiency drops as they are approached. It is an object of this invention to increase the efficiency of a centrifugal separator during periods of overload and to construct them to have self adjusting tendencies as the load increases.

In the use of centrifugal separators to remove particles from dust or powder laden gas streams such as in removing solid heterogeneous catalyst particles from a stream of reaction product or regenerating gas, it has been noticed that particular points in the separator are subject to excessive wear due to erosion. One particular point of high erosion is at the entrance to the separating zone from the inlet conduit; particularly at the lower edge of the inlet conduit. The erosion in this region is due to the fact that some of the particles in the laden gas stream settle in the inlet conduit due to gravity and concentrate in the lower portion of the conduit. When the gas stream containing large quantities of particles discharges into the separating zone, the point of the cyclone adjacent the lower boundary of the inlet experiences greater erosion since it is subjected to the action of greater quantities of particles. It is an object of this invention to substantially eliminate the high erosion area at the inlet to a centrifugal separator by removing the particles that are settled by gravity from the laden gas stream prior to the introduction of the laden gas stream into the centrifugal separator.

These objects are accomplished by providing the inlet conduit to the centrifugal separator with a perforate lower wall or floor member so that the particles that are settled by gravity will fall through the perforations rather than concentrate on the floor portion of the conduit. This produces a gas stream entering the centrifugal separation zone which is of substantially uniform concentration with regard to particles over its entire cross-section since the gravity settleable particles will have already been removed through the perforations.

The apparatus of the present invention is particularly useful when the gas stream is laden with non-uniform size particles, is overloaded with particles, and when the separation apparatus is subjected to varying loads. When non-uniform particle distribution in the gas is experienced, the heavier or larger particles which have the greatest inertia and therefore are most affected by the exaggerated gravity in a centrifugal separator, are settled by gravity in the inlet conduit to the separator. Upon falling on the floor portion of the inlet conduit these readily settleable particles pass through the perforations into an annularly disposed chamber that conducts the particles thus separated into the lower portion or collection zone of the separator where other settled particles from the centrifugal separation zone are accumulated. By this means these large particles, which cause the greatest erosion damages to a centrifugal separation apparatus, by-pass the centrifugal separation zone and are conducted directly to the separated particle collection zone.

When the separation device is subjected to varying loads, that is intermittent periods of light service and heavy service or overload service, this invention is particularly useful since the extremely heavily laden gas stream will be more affected by gravity in the inlet conduit and a higher concentration of particles will be found in the floor region of the inlet conduit than in the upper regions. A portion of the gas will by-pass the centrifugal separation zone through the perforations, however, this small proportion will only increase the efficiency of the perforations in that it will carry a large number of particles per unit volume of gas compared with the rest of the gas in the stream.

The apparatus of the present invention can be best understood with reference to the accompanying drawing which illustrates in Figure 1 a sectional elevational view of at least one embodiment of the present invention which is intended to illustrate rather than limit the invention to the particular apparatus shown. Figure 2 is a sectional plan view taken along plane 2—2 of the apparatus illustrated in Figure 1. Figures 3 and 4 are similar views of another embodiment of this invention.

Referring now to the drawing, particle laden gas passes through inlet conduit 1, having perforate floor member 4, and passes in a curved path entering separator 3 tangentially. Separator 3 comprises cylindrical upper portion 2 and an inverted conical portion disposed therebeneath. The conical portion is enlarged at its upper extremity to form chamber 5 which is disposed beneath the beforementioned perforate floor member 4 and which connects the inlet conduit to the conical section of the separator. Solids outlet conduit 6 is disposed at the point of the aforementioned conical section and gas outlet 7 extends through the upper portion of the separator and opens axially to both the cylindrical section 2 and the conical section of the separator at a point intermediate the height of cylindrical section 2.

In operation, a laden gas stream enters conduit 1. Particles in the gas stream that are settled by gravity will fall upon perforate floor member 4, will pass through the perforations contained therein and will be conducted through chamber 5 into conical or collecting section 3 of the separator. The particles not settled by gravity will be accelerated in a circular path and will be separated in the conventional manner of a cyclone separator, being held to the periphery of cylindrical portion 2 by centrifugal force and eventually dropping into the conical portion where they join the more readily settled particles from chamber 5. The combined stream of readily settled and difficulty settled particles is discharged from separator 3 through conduit 6 while a substantially particle free gas stream discharges from an intermediate portion of the separator through conduit 7.

The construction of the apparatus may perhaps be more clearly understood by reference to Figure 2. Curved inlet conduit 1 may have a continuously diminishing cross-section area as it approaches the inlet to the centrifugal separator. The diminishing cross-section area tends to increase the stream velocity and therefore decrease the pressure of the stream which improves the separation since the escape of some gas through the perforations of the floor member would normally cause a diminishing velocity. It is desirable that the gas stream have a high velocity when it enters the centrifugal portion of the separator so that sufficient centrifugal force may be exerted on the particles to cause them to remain at the periphery of the separator. Although the illustration indicates a wrap-around type inlet opening, this invention also includes centrifugal separators of the extended type opening which are substantially straight conduits that intersect the centrifugal separator tangentially. When an extended inlet is used in place of a wrap-around inlet, the chamber 5 will assume an elongated shape so that it is beneath at least a substantial portion of the inlet conduit prior to its intersection with the centrifugal separator. It is advantageous to construct the extended inlet conduit with a continuously diminishing cross-secion area as it approaches the separator for reasons hereinbefore discussed.

When a wrap-around inlet conduit is used the particles will accumulate against the outside wall, that is the wall farthest from the center of the separator. The particles settle to the floor of the conduit by sliding down the wall. The efficiency of a wrap-around inlet conduit may be increased by distributing the perforations in the floor member so that there is more open area near the junction of the floor member and the outside wall than the junction with the inside wall and the floor member. It may be advantageous to slope the outside wall member outwardly and downwardly so that centrifugal force as well as gravity will drive the particles towards the floor.

In the figure the perforate floor member 4 conforms with the shape of the inlet conduit and, in this embodiment, extends beyond the opening to the centrifugal separator to form a gradual junction with the wall thereof. Centrifugal separator 2 has a circular cross-section and in this view superimposes the conical section therebeneath. Gas outlet conduit 7 is axially disposed and superimposes the particle outlet conduit in the bottom of the separator.

Figures 3 and 4 illustrate one particularly advantageous adaptation of the present invention. Figure 3 is a sectional elevational view of the modified centrifugal separator wherein the perforations in floor member 4' consist of louvres 8 which open away from the direction of the stream flow thereby causing a separation of the particles concentrated near the floor of the inlet conduit without passage of too much gas. This prevents the flow pattern within the centrifugal separation zone from being disturbed by the introduction of an undue amount of gas into this zone. Figure 4 which is a sectional plan view along plane 4—4 of the apparatus of Figure 3 further illustrates the relative shape or position of louvres 8 which are disposed in floor member 4'.

There may be many modifications of the herein described apparatus which do not remove the modified apparatus from the broad scope of this invention. Some of these may include the use of various types of centrifugal separators having various shapes or designs, the use of slots or other shapes for the perforations in the floor member of the inlet conduit, the use of several separators in series and many others.

From the foregoing description it may be seen that the particle separator of this invention provides a means of increasing the efficiency of and extending the useful life of a centrifugal separator by substantially eliminating localized areas of high wear and by diminishing the overload during periods of high particle concentrations.

I claim as my invention:

1. A centrifugal separator comprising a cylindrical separating chamber, a tangential inlet conduit around a portion of the exterior of said chamber and communicating at its discharge end with the interior of the chamber, said conduit having imperforate side walls and a perforated floor member, a particle collecting chamber having an inverted conical shaped portion below and in open communication with said cylindrical chamber and having an enlarged upper side portion beneath said floor member and in communication with said inlet conduit through the perforations in the floor member, means for discharging gas from said cylindrical chamber and means for removing separated solids from said collecting chamber.

2. The apparatus of claim 1 further characterized in that said perforations comprise punched circular holes.

3. The apparatus of claim 1 further characterized in that said perforations comprise louvres.

4. The apparatus of claim 1 further characterized in that said inlet conduit has a continuously diminishing cross-section area as it approaches said cylindrical chamber.

References Cited in the file of this patent

UNITED STATES PATENTS

| Number | Name | Date |
|---|---|---|
| 297,436 | Ortman et al. | Apr. 22, 1884 |
| 567,021 | Day | Sept. 1, 1896 |
| 992,531 | Allington | May 16, 1911 |
| 1,031,862 | Morse | July 9, 1912 |
| 1,958,577 | Hirshfeld | May 15, 1934 |
| 2,295,101 | Dunham | Sept. 8, 1942 |
| 2,300,129 | McCurdy | Oct. 27, 1942 |